United States Patent
Crook et al.

(10) Patent No.: US 6,889,289 B2
(45) Date of Patent: *May 3, 2005

(54) METHOD OF DISTRIBUTED CACHING

(75) Inventors: Neal A. Crook, Berkshire (GB); Alan Wootton, Saratoga, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 10/861,499

(22) Filed: Jun. 7, 2004

(65) Prior Publication Data

US 2004/0222997 A1 Nov. 11, 2004

Related U.S. Application Data

(63) Continuation of application No. 09/987,765, filed on Nov. 15, 2001, now Pat. No. 6,754,772.

(51) Int. Cl.[7] .............................................. G06F 12/08
(52) U.S. Cl. ...................................... 711/118; 345/557
(58) Field of Search ................................. 711/118, 138, 711/133, 141, 117, 156; 345/557, 558

(56) References Cited

U.S. PATENT DOCUMENTS

| | | |
|---|---|---|
| 5,040,129 A | 8/1991 | Nishiyama |
| 5,148,293 A | 9/1992 | Miyachi |
| 5,208,908 A | 5/1993 | Harrison et al. |
| 6,101,576 A | 8/2000 | Kobayashi et al. |
| 6,121,970 A | 9/2000 | Guedalia |
| 6,181,352 B1 | 1/2001 | Kirk et al. |

*Primary Examiner*—Hiep T. Nguyen
(74) *Attorney, Agent, or Firm*—Dickstein Shapiro Morin & Oshinsky LLP

(57) ABSTRACT

A system and method for distributed cache. Cache tag storage and cache data storage are maintained in separate pipeline stages. Cache tag storage is operated by a data producer. Cache data storage is operated by a data consumer. Cache hits and misses are determined by the data producer prior to any operations being performed by the processor. In the event of a cache miss, produced data is sent to the processor to be processed. In the event of a cache hit, the cache address of the corresponding previously processed data is sent to the data consumer so that the corresponding processed data unit can be retrieved from cache data storage.

21 Claims, 6 Drawing Sheets

METHOD OF DISTRIBUTED CACHING

This application is a continuation of application Ser. No. 09/987,765, filed Nov. 15, 2001 (now U.S. Pat. No. 6,754,772), the subject matter of which is incorporated by reference herein.

FIELD OF THE INVENTION

The present invention relates generally to caching processed data, and, more particularly, to a method and apparatus for distributing the functions of cache to different stages in an execution pipeline such that the stages can operate independently while saving processing time and preventing data hazards.

BACKGROUND OF THE INVENTION

The function of a 3D graphics processing pipeline for a computer is to represent a 3-dimensional scene on a 2-dimensional computer display screen. In order to change view-point within the 3-dimensional scene, the graphics processing pipeline must redraw the scene according to the new view-point; this can affect perspective, lighting, reflections, the obscuring or revealing of objects and so forth. This requires a large amount of calculation.

Consider the polygon shown in FIG. 1a. The symbols a, b, c, and d represent the vertices of the polygon. The characteristics of each vertex include such information as its position in 3-dimensional space (x, y, z Cartesian co-ordinates), its color, its transparency, and its texture.

When drawing a scene, the 3D graphics processor works with flat surfaces. The most complex surface that is guaranteed to be flat is a triangle. Therefore, part of the process of displaying the polygon abcd involves tessellating it into triangles. This process is shown in FIG. 1b. The polygon abcd is now represented by the two triangles abc and adc. For more complex shapes, tessellation can lead to the introduction of new vertices, as shown in the tessellation of FIG. 1c.

The task of drawing the polygon is now replaced by the task of drawing the two triangles abc and adc. One way of representing the task to the 3D graphics pipeline is to produce a sequence of triplets representing the vertices to be drawn: abcadc. Each identifier a, b, c, and d must uniquely define a particular vertex within a scene, but a vertex can be shared with several triangles. In addition, the identifier allows the characteristics of the vertex (the position, color, transparency, etc.) to be retrieved from storage elsewhere in the system.

Part of the functions performed by a 3D-graphics processor are shown in FIG. 2. The sequence of triplets is passed to data producer 20. Producer 20 is responsible for translating a vertex identifier "a" into the vertex characteristics "A". "a" represents a relatively small data item (for example, an 8-bit value) while "A" represents a number of relatively large data items (for example, 16, 32-bit values). The translation process is costly in terms of time and occupied system resources; for example, it might require a number of memory accesses and data conversion operations.

The vertex characteristics "A" are processed by a processor and the processed vertex "A'" is passed to the consumer (the next stage in the pipeline). The processing performed by the processor is costly in terms of time.

The vertices "a" and "c" are each processed twice for polygon abcd—once for triangle abc and once for triangle acd. The result of processing a given vertex is identical, irrespective of the triangle it is being processed for. It wastes resources to translate the vertex identifier and process the vertex multiple times, so performance would be improved by maintaining a cache of transformed vertices.

The rate at which producer 20, processor 21 and consumer 22 handle data is different and may vary on a triangle-by-triangle or vertex-by-vertex basis. With the system shown in FIG. 2, the slowest unit determines the rate at any time, and faster units are stalled. This is an inefficient use of resources.

One way to more efficiently utilize the resources of a 3D-graphics pipeline is by using the cache as shown in FIG. 3. Producer 30 translates a vertex identifier "a" and writes the translated vertex data "A" to data FIFO 31. Data FIFO 31 is a first in first out queue. Data is sent from producer 30 to data FIFO 31 where processor 32 can access it when ready. When producer 30 translates a vertex faster than processor 32 processes a vertex, multiple data units can be stored in data FIFO 31. Similarly, when processor 32 begins to processes data units at a faster rate than producer 30 translates vertices, processor 32, rather than stalling immediately, continues to read translated vertices from data FIFO 31 until it is empty.

Processor 32 maintains a cache tag storage 36 with tags containing the minimum amount of information A', B', C', D' required to uniquely identify a data unit incoming to processor 32, i.e. data A, B, C, D. The minimum amount of information required to uniquely identify a data unit that is stored in cache tag storage 36 can be the data unit itself, a shortened form of the data unit, or an identifier derived from the data unit. For each element A', B', C', D' of tag storage, there is a corresponding element of processed data A", B", C", D" stored in cache data storage 37. Thus, cache data storage 37 contains processed data A", B", C", D" corresponding to input data A, B, C, D previously processed by processor 32. The tags A', B', C', D' must be stored as well as the data A", B", C", D", so that the tags can be compared to the incoming data units before they are processed so the processor 32 can determine if there is cached data A", B", C", D" corresponding to incoming data A, B, C, D. When processor 32 removes a data unit from data FIFO 31, it checks to see whether the data unit has a corresponding tag A', B', C', D' currently in cache tag storage 36. If there is no corresponding tag in cache data storage 36, that is, processor 32 gets a cache "miss," processor 32 stores a tag for the incoming data unit from FIFO 31 in cache tag storage 36 by using a currently unused storage location or reallocating a location that currently holds an old tag in cache tag storage 36. Processor 32 also processes the incoming data unit and stores the newly processed data unit as cache data in the corresponding location in cache data storage 37. The processed data is also passed through multiplexor 33 under control of processor 32 to a FIFO 34 for processed data and from there to a data consumer 35. If processor 32 finds a cache tag in tag storage 36, that is, it gets a cache "hit," then processor 32 operates multiplexor 33 and cache data storage 37 so that the cache data, corresponding to the cache tag for which there was a "hit," is passed through FIFO 34 to consumer 35. Consumer 35 can then take each processed data unit from data FIFO 34 in the correct order. For a 3D graphics processing pipeline, processor 32 might transform vertex data "A" according to the point of view for which the scene is to be rendered and according to the way in which the scene is lit to produce processed data A".

There are, however, still some problems with the method discussed above. While a cache "hit" saves the latency associated with processor 32 having to reprocess previously processed data, it does not save the time taken by producer 30 to generate the stream ABCD from incoming data stream abcd or the time taken by processor 32 to check for cache hits and misses. In addition, the values A'B'C'D' are likely to be larger than abcd requiring greater storage capacity in cache tag storage 36.

Thus, there exists a desire and need for a system and method for more efficiently performing cache functions.

BRIEF SUMMARY OF THE INVENTION

The present invention mitigates the problems associated with the prior art and provides a unique method and system of distributed cache.

In accordance with an exemplary embodiment of the present invention, a cache tag storage is provided which is maintained by a producer which sends data to the processor. A cache data storage is also provided which holds data output from a processor. A producer determines cache hits and misses without performing any translations on the data, and passes cache hit information through a control path to the consumer without any involvement from the processor. A cache miss causes the producer to fetch and translate data and pass that data to the processor for processing. The producer implements a cache replacement algorithm and manages the cache tag storage in accordance with the algorithm.

The consumer uses information from the control path to allow it to read data from the output of the processor and the cache storage in the correct data order. The consumer also manages the cache data storage, in accordance with a cache replacement algorithm compatible with that used by the producer, by writing certain values that it has read from the output of the processor into the cache storage.

BRIEF DESCRIPTION OF THE DRAWINGS

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to make and use the invention, and it is to be understood that structural changes may be made and equivalent structures substituted for those shown without departing from the spirit and scope of the present invention.

Figure 1A:
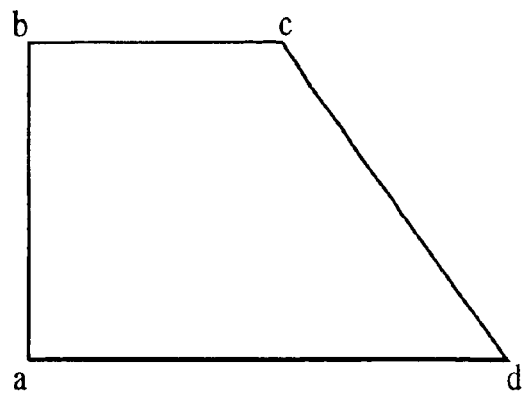
FIGS. 1a–1c are an illustration of the tessellation of a few shapes
Figure 1B:
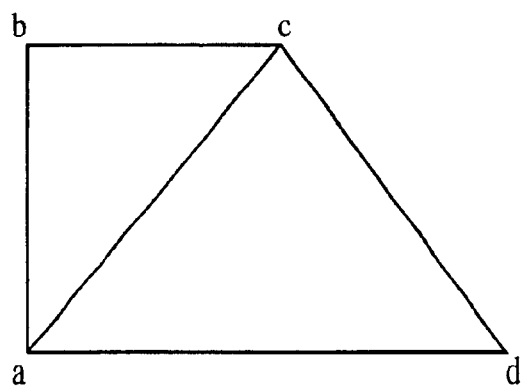
Figure 1C:
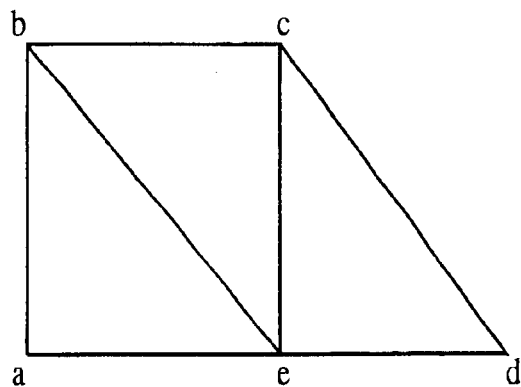
Figure 2:
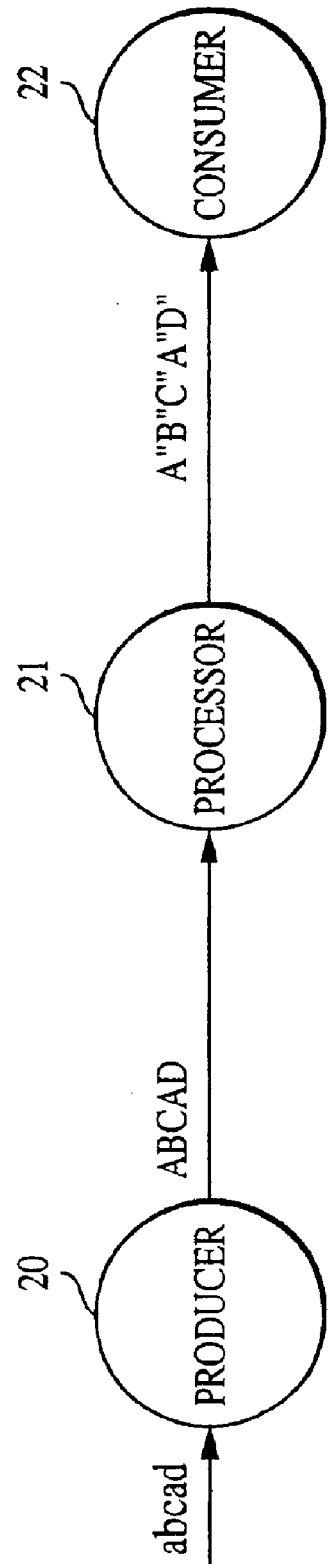
FIG. 2 is a block diagram of a conventional graphics pipeline.
Figure 3:
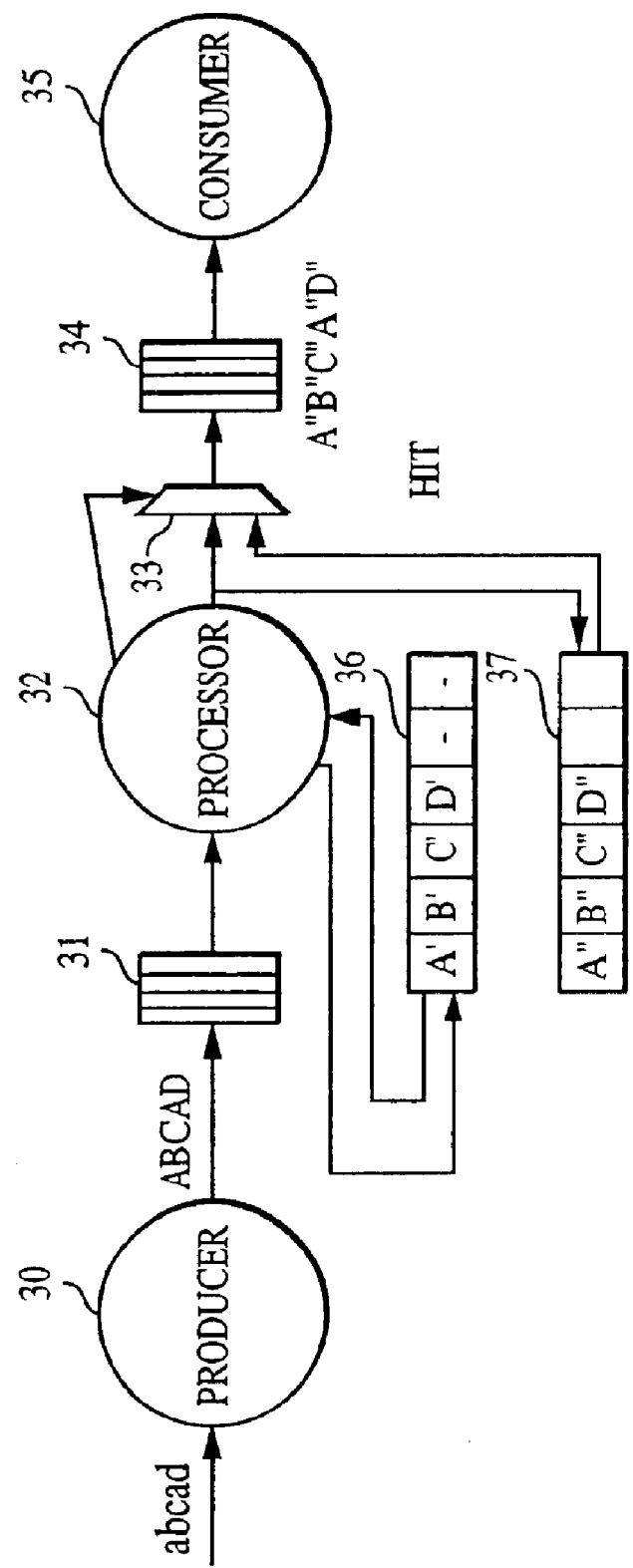
FIG. 3 is a block diagram of a conventional simple cache in a graphics pipeline.
Figure 4:
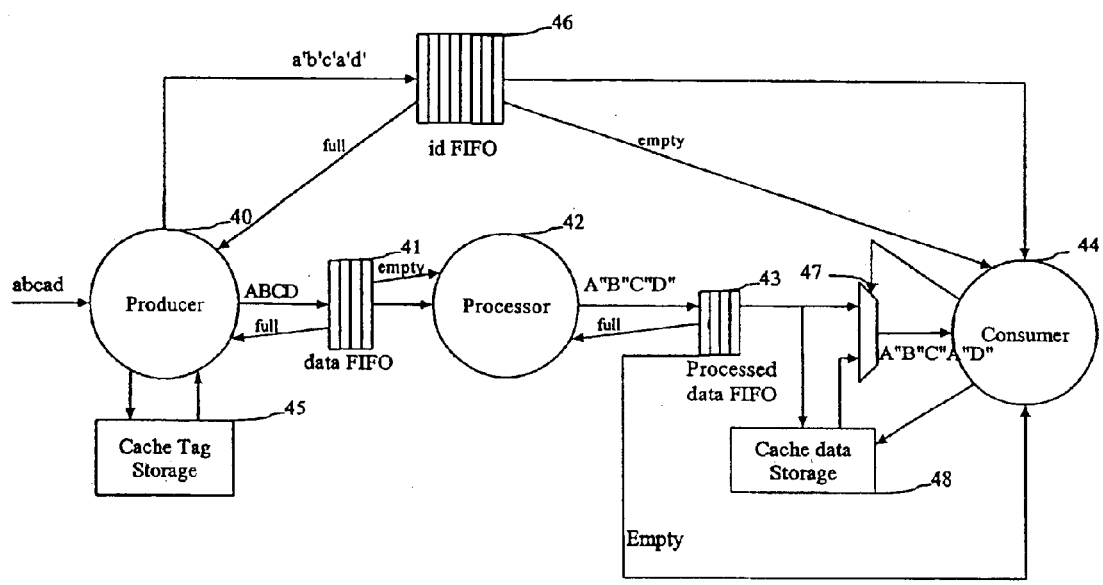
FIG. 4 is a block diagram of a first exemplary embodiment of a distributed cache in accordance with the present invention.

In accordance with a first exemplary embodiment of the present invention, a processor system can distribute the functions of a cache to increase system performance by eliminating re-fetching and re-processing of data. FIG. 4 illustrates the flow of data for a distributed cache in accordance with the first exemplary embodiment of the invention. The two cache storage elements, cache tag storage 45 and cache data storage 48, are controlled separately. Cache tag storage 45 is controlled by producer 40 while cache data storage 48 is controlled by consumer 44. A data path through identification FIFO 46 passes cache control information from producer 40 to consumer 44. Data FIFO 41, identification FIFO 46 and processed data FIFO 43 are all data storage elements that are operated as first in first out queues.

Incoming data units a, b, c, a, d, are sent to producer 40. When producer 40 receives an incoming data unit, e.g. "a", producer 40 examines cache tag storage 45 and determines whether data "a," or a derived data tag corresponding to data "a," is stored in cache tag storage 45 and will produce a cache "hit" or cache "miss." A cache hit means that the end result of processing the incoming data unit by processor 42 is already stored in cache data storage 48 and processor 42 does not have to reprocess the incoming data unit, while a cache miss means that the end result of processing the incoming data unit is not stored in cache data storage 48 and processor 42 must process the incoming data unit.

If an incoming data unit, e.g. "a," produces a cache "miss" when producer 40 examines cache tag storage 45, producer 40 uses a cache allocation and replacement algorithm to determine whether to allocate space for "a" in cache data storage 48. The simplest algorithm is to always allocate an entry on a cache miss, and always to replace the oldest data entry. However, any of the other algorithms for cache allocation and replacement that are well known in the art, such as, for example, replacing the least recently used data entry or the most recently used data entry may be used. If space is allocated for "a" in cache tag storage 45, producer 40 updates cache tag storage 45 to show that "a" is now in the cache. The allocation of space for a new entry in the cache may require the deletion of some other entry in the cache, which takes place in accordance with the cache allocation and replacement algorithm.

If an incoming data unit, e.g. "a," produces a cache "miss" when producer 40 examines cache tag storage 45, producer 40 then generates data "A" from data "a" which is then sent to data FIFO 41. When "A" becomes the oldest data unit in data FIFO 41, processor 42 will read "A". Processor 42 will then process data "A" into data "A''". Once processor 42 completes transforming "A" into "A''", processor 42 sends "A''" to processed data FIFO 43.

For each incoming data unit, e.g. "a," producer 40 sends a corresponding data unit "a'" to identification FIFO 46. The value of "a'" is determined by the outcome of the examination of cache tag storage 45 and the cache allocation and replacement algorithm in use, as follows:

If producer 40 determined that "a" produced a cache "hit," the value of "a'" indicates that processed data "A''" corresponding to "a" is in cache data storage 48 and furthermore, it indicates the location within cache data storage 48 where "A''" is stored.

If producer 40 determined that "a" produced a cache "miss" and no storage is to be allocated, the value of "a'" indicates that the processed data "A''" corresponding to "a" must be read from the processed data FIFO 43.

If producer 40 determined that "a" produced a cache "miss" and that storage is to be allocated, the value of "a'"

indicates that the processed data "A'''" corresponding to "a" must be read from the processed data FIFO 43, and that the data read must be written into the cache data storage 48 and furthermore, it indicates the location within cache data storage 28 where "A'''" is to be written.

Consumer 44 reads the oldest data unit (e.g. "a'") from id FIFO 46. If "a'" indicates a cache "miss" where space has not been allocated in cache data storage 48, consumer 44 sends a signal to multiplexor ("MUX") 47 to select processed data FIFO 43. Consumer 44 then reads the oldest data unit "A''" from processed data FIFO 43 which corresponds to "a". If "a'" indicates a cache "miss" where space has been allocated in cache data storage 48, consumer 44 sends a signal to MUX 47 to select processed data FIFO 43. Consumer 44 then reads the oldest data unit "A''" from processed data FIFO 23 which corresponds to "a", and, preferably simultaneously, writes "A''" to cache data storage 48 at the address specified in "a'". If "a'" indicates a cache "hit," consumer 44 sends a signal to MUX 47 to select cache data storage 48. Consumer 44 then reads "A''" from the address in cache data storage 48 specified in "a'".

Since producer 40, processor 42 and consumer 44 all work at different rates, it is possible for any of the three FIFOs 41, 43, or 46 to become empty or full. If producer 40, processor 42, or consumer 44 wishes to read from a FIFO that is empty or write to a FIFO that is full, it must stall (wait) until the full/empty condition has changed.

Thus, for processed data "A''" which is present in cache data storage 48, corresponding to data "a" arriving at producer 40, producer 40 need not translate the vertex identifier "a" into the vertex characteristics "A", and processor 42 need not process data "A" from producer 40 to produce the processed data "A''." By avoiding re-processing data that is in the cache data storage 48, more processing power is available to handle data that is not. Moreover, data read from cache data storage 48 as a result of a cache "hit" is available to consumer 44 with a lower latency than if it had to be processed by processor 42.

The present embodiment can be further improved by adding a valid bit to each entry in cache tag storage 45. Producer 40 would determine if an entry is active by its valid bit. This would allow producer 40 to effectively clear the cache by setting all of the valid bits to null.

Figure 5:
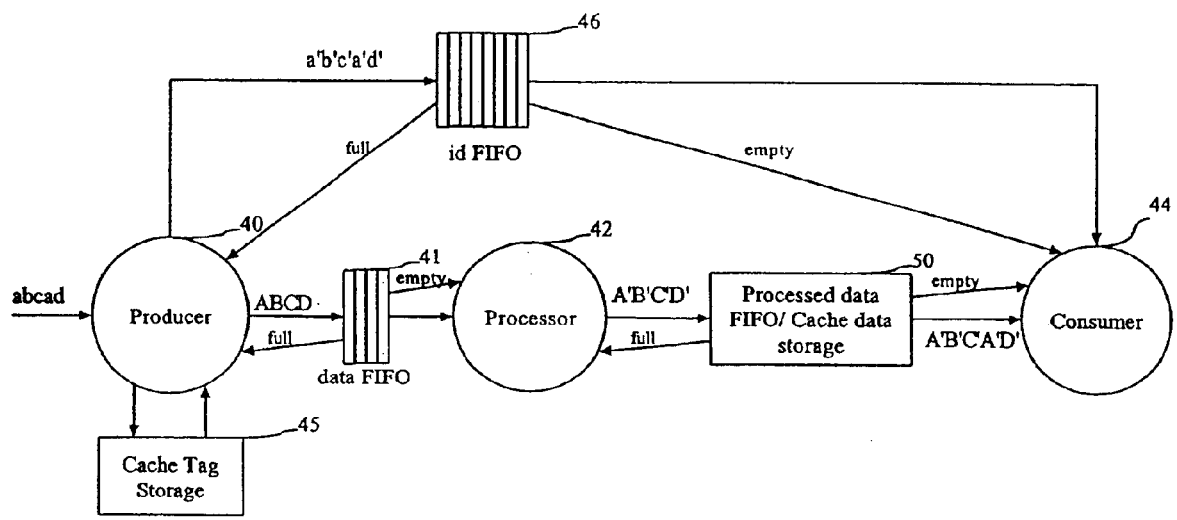
FIG. 5 is a block diagram of second exemplary embodiment of a distributed cache in accordance with the present invention.

FIG. 5 illustrates a second exemplary embodiment of a distributed cache system in accordance with the invention. In this embodiment, processed data FIFO 43 is combined with cache data storage 48 in the form of a circular buffer. The resulting processed data FIFO/cache data storage 50 performs the functions of both.

While the system described in FIG. 4 allows cache data storage 48 and processed data FIFO 43 to each be implemented in an efficient way, there are other considerations that might make combining cache data storage 48 and processed data FIFO 43 desirable. There is a fixed overhead for each memory device used (i.e. power rings and address decoder logic) which is reduced by having fewer memory devices. However, this merged system can only be implemented efficiently when the cache use a FIFO replacement algorithm, so that the addition of a new entry to the cache causes the displacement of the oldest entry currently in the cache.

Figure 6A:
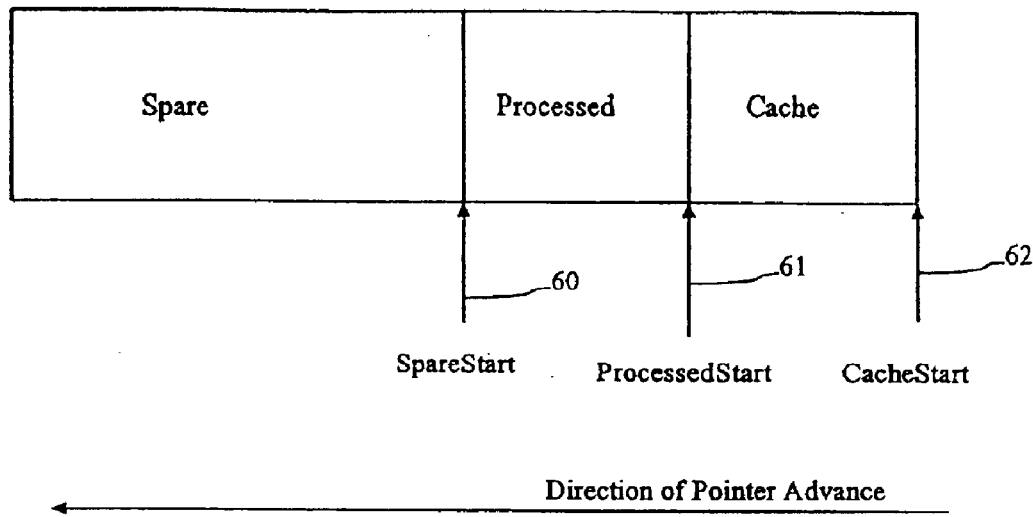
FIG. 6a and FIG. 6b are block diagrams of the memory allocation scheme for a combined processed data FIFO and cache data storage.
Figure 6B:
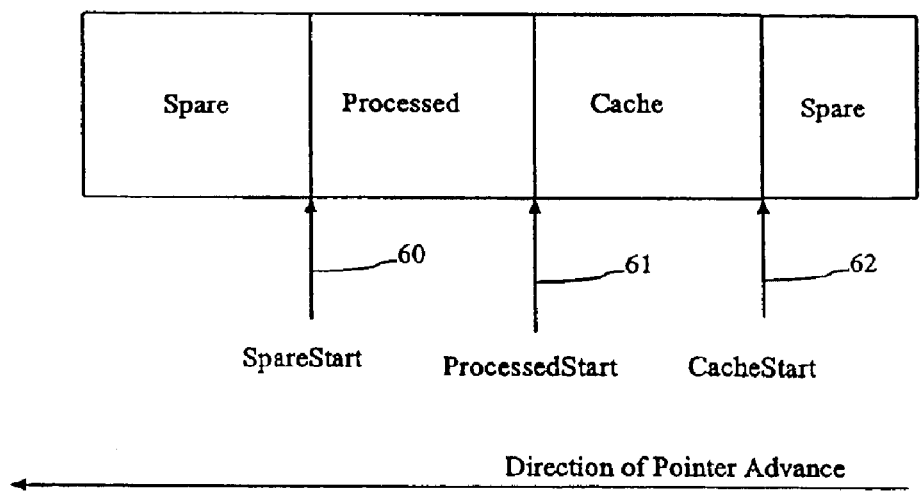

Processed data FIFO/Cache data storage 50, as represented in FIGS. 6a and 6b, has three operating pointers—SpareStart 60, ProcessedStart 61, and CacheStart 62, which delimit the Spare, Processed, and Cache regions of the data storage. This contrasts with the implementation of a normal FIFO, which has two operating pointers (a Filling pointer and an Emptying pointer which delimit the Spare and Used regions of a FIFO). When processed data FIFO/Cache data storage 50 is initialized CacheStart 62 points to the address of the first storage location in processed data FIFO/Cache data storage 50, ProcessedStart 61 points to a storage location leaving the Cache region large enough to hold a pre-determined number of processed data units corresponding to the number of cache tags that can be stored in cache tag storage 45, and SpareStart 60 is equal to ProcessedStart 61.

The processed data FIFO/Cache data storage 50 can have additional regions. The key feature is that it contains a Cache region, which moves, and some other regions, and that comparisons of pointers within processed data FIFO/Cache data storage 50 prevent the Cache region from being overwritten in order to avoid a read-before-write hazard.

In the embodiment depicted in FIG. 5, producer 40 and processor 42 behave in the same way as described for the embodiment depicted in FIG. 4.

Each time that Processor 42 generates a new processed data unit, it writes the processed data unit into the processed data FIFO/Cache data storage 50 storage locations immediately to the left of the location pointed to by SpareStart 60, and then advances SpareStart 60. The processed data FIFO/Cache data storage 50 is a circular buffer so incrementing a pointer beyond the final location (i.e. the location farthest to the left) in processed data FIFO/Cache data storage 50 causes it to wrap around to the start (i.e. the location farthest to the right), as can be seen in FIG. 6b. If SpareStart 60 equals CacheStart 62, the Spare region has shrunk to zero size, and the Processed region has grown to its maximum size. In these circumstances, processor 40 must stall to avoid overwriting the Cache region.

Consumer 44 processes entries from identification FIFO 46 in the same manner as described above with reference to FIG. 4. Each time it detects a cache "hit," it retrieves the data from the cache region of processed data FIFO/Cache data storage 50. When consumer 44 detects a cache "miss," the required data must be the oldest unit in the processed region (e.g. the data starting at the address designated by ProcessedStart 61). If ProcessedStart 61 is equal to SpareStart 60, the Processed region has shrunk to zero size and consumer 44 must stall until processor 42 has generated the next piece of data. Otherwise, the round-robin allocation policy dictates that the oldest entry in the cache must be discarded and replaced by the entry at the start of the processed region. This is accomplished by advancing CacheStart 62 and ProcessedStart 61. The Processed region shrinks in size, the Cache region remains the same size and the Spare region grows in size. The discarded entry from the cache region becomes part of the Spare region.

Although Producer 40 must determine "hit"/"miss" information, it is not necessary for the identification FIFO to contain "hit"/"miss" information. Consumer 44 can determine whether an entry is in the Cache region (and is therefore a "hit") by comparing the address of the entry with the values of CacheStart 62 and ProcessedStart 61 pointers.

The processed data FIFO/cache data storage 50 implements a circular buffer. If the data buses and processed data FIFO/cache data storage 50 width match the data unit size, a data unit will fit in a single processed data FIFO/cache data storage 50 location. Increments to CacheStart 62, ProcessedStart 61, and SpareStart 60 pointers will be by 1. If the data buses and processed data FIFO/cache data storage 50 width are smaller than the data unit size, so that a data unit will require n successive locations within processed data FIFO/cache data storage 50, increments to the pointers will be by n. The value of n need not be constant. However, if the value of n is changed, the cache must be invalidated so that pointers 60, 61, 62 can be re-initialized correctly.

Algorithms (1) and (2) show two ways to increment the pointers that control the combined processed data FIFO/cache data storage 50. Both of these algorithms are easy to implement in hardware.

---

Algorithm 1:

pointer = (pointer + n) modulo (size of processed data FIFO/cache data storage 50)

Algorithm 2:

if (pointer + n) > (size of processed data FIFO/cache data storage 50) then
    pointer = 0
else
    pointer = pointer + n

---

Algorithm (2) leaves some processed data FIFO/cache data storage 50 locations unused when the size of processed data FIFO/cache data storage 50 is not an integer multiple of the data unit size. The advantage of algorithm (2), however, is that it makes it easier to detect the stall condition on SpareStart 60>=CacheStart 62. Using algorithm (1), this comparison has to take into account the possibility that SpareStart 60 has wrapped around the end of the buffer. Using algorithm (2), the stall condition can be simplified to SpareStart 60=CacheStart 62, which does not require the detection of wrap-around and can therefore be implemented more efficiently.

The present invention allows a processor to cache processed data without performing the caching functions itself. The apparent speed of the system is increased because the processor does not determine when there is a cache hit or miss or store or retrieve the cached data. A producer performs the functions of determining whether there is a cache hit or miss while a consumer retrieves the cached data in the event of a cache hit.

Generally, each cache tag in cache tag storage 45 has an associated "valid" bit. The "valid" bit indicates that the particular location in the cache contains a valid cache tag. If it is necessary to flush the cache, all of the "valid" bits can be cleared. Once the "valid" bits are cleared, producer 40 will begin writing to cache tag storage 45 and allocating space in cache data storage 48 as though they are empty. Any data in transit at the time (for example, in id FIFO 46, data FIFO 41, or processed data FIFO 43) will still be processed correctly because the data in cache data storage 48 will not be affected until every entry in id FIFO 46 that was in transit when the cache was flushed has been processed.

Another method of flushing the cache uses pointers (that are controlled by Producer 40) to point to the first and last cache tags that have been allocated. Since cache tags are allocated in order, the cache can be flushed by setting the first cache tag pointer to the same value as the second cache tag pointer. As with the method of flushing the cache described above, any data in transit at the time the pointers are reset will be processed correctly.

Arbitrary delays can be introduced on any of the data paths without affecting the correct operation of the system. Therefore, different parts of the system can operate in independent clock domains and dock synchronization can be performed across the data paths.

While the invention has been described with reference to exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed as new and desired to be protected by letters Patent of the United States is:

1. A method for operating a cache, comprising:
    receiving, at a first circuit, an input data and producing an intermediate data corresponding to said input data;
    receiving, at a second circuit, said intermediate data from said first circuit and producing a final data corresponding to said intermediate data;
    receiving, at a third circuit, said final data, wherein said final data is received from either said second circuit or a data memory of a distributed cache;
    maintaining, by said first circuit, status information regarding contents of said data memory in a tag memory of said distributed cache; and
    maintaining, by said third circuit, said final data in said data memory of said distributed cache.

2. The method of claim 1, further comprising:
    sending, by said first circuit, a control information, to said third circuit;
    wherein said third circuit determines whether to receive said final data from said second circuit or said data memory of said distributed cache.

3. The method of claim 2, wherein said first circuit sends said control information corresponding to said third circuit receiving said final data from said second circuit if a state of said tag memory indicates that said data memory of said distributed cache does not include said final data.

4. The method of claim 3, wherein said control information also includes an address of said data memory.

5. The method of claim 4, wherein said address corresponds to an unused portion of said data memory of said distributed cache.

6. The method of claim 5, wherein if there are no unused portion of said data memory of said distributed cache, said address corresponds to a least recently used portion of said data memory.

7. The method of claim 4, wherein said step of maintaining, by said third circuit, includes storing said final data from said second circuit in said data memory at said address.

8. The method of claim 2, wherein said first circuit sends said control information corresponding to said third circuit receiving said final data from said data memory of said distributed cache if a state of said tag memory indicates that said data memory of said distributed cache includes said final data.

9. The method of claim 8, wherein said control information also includes an address of said data memory.

10. The method of claim 9, wherein said third circuit receives said final data by reading said data memory of said distributed cache at said address.

11. The method of claim 9, wherein when state of said tag memory indicates that said data memory of said distributed cache includes said final data,
    said first circuit does not produce said intermediate data; and
    said second circuit does not produce said final data.

12. The method of claim 1, further comprising:
    buffering said intermediate data between said first circuit and said second circuit before said intermediate data is received by said second circuit.

13. The method of claim 12, wherein said buffering is in accordance with a first-in-first-out (FIFO) policy.

14. The method of claim 1, further comprising:
buffering said final data between said second circuit and said third circuit before said intermediate data is received by said third circuit.

15. The method of claim 14, wherein said buffering is in accordance with a first-in-first-out (FIFO) policy.

16. The method of claim 2, further comprising:
buffering said control information between said first circuit and said third circuit before said control data is received by said third circuit.

17. The method of claim 16, wherein said buffering is in accordance with a first-in-first-out (FIFO) policy.

18. The method of claim 1, wherein said method is performed in a graphical rendering system and said input data comprises a set of data identifying a vertex of a polygon.

19. The method of claim 18, wherein said set of data identifying a vertex of a polygon comprises at least one of a group comprising:
a set of coordinates of said vertex in a multi-dimensional space;
a color of said vertex;
a transparency of said vertex; and
a texture of said vertex.

20. The method of claim 19, wherein said intermediate data comprises a first set of characteristics corresponding to said vertex of said polygon.

21. The method of claim 20, wherein said final data comprises a second set of characteristics corresponding to said vertex of said polygon.

* * * * *

UNITED STATES PATENT AND TRADEMARK OFFICE
CERTIFICATE OF CORRECTION

PATENT NO. : 6,889,289 B2
DATED : May 3, 2005
INVENTOR(S) : Neal A. Crook et al.

It is certified that error appears in the above-identified patent and that said Letters Patent is hereby corrected as shown below:

Column 3,
Line 50, "of second" should read -- of a second --;

Column 8,
Line 41, "portion" should read -- portions --.

Signed and Sealed this

Ninth Day of August, 2005

JON W. DUDAS
*Director of the United States Patent and Trademark Office*